J. HADFORD.
AGRICULTURAL IMPLEMENT.
APPLICATION FILED APR. 26, 1913.
1,127,233.
Patented Feb. 2, 1915.
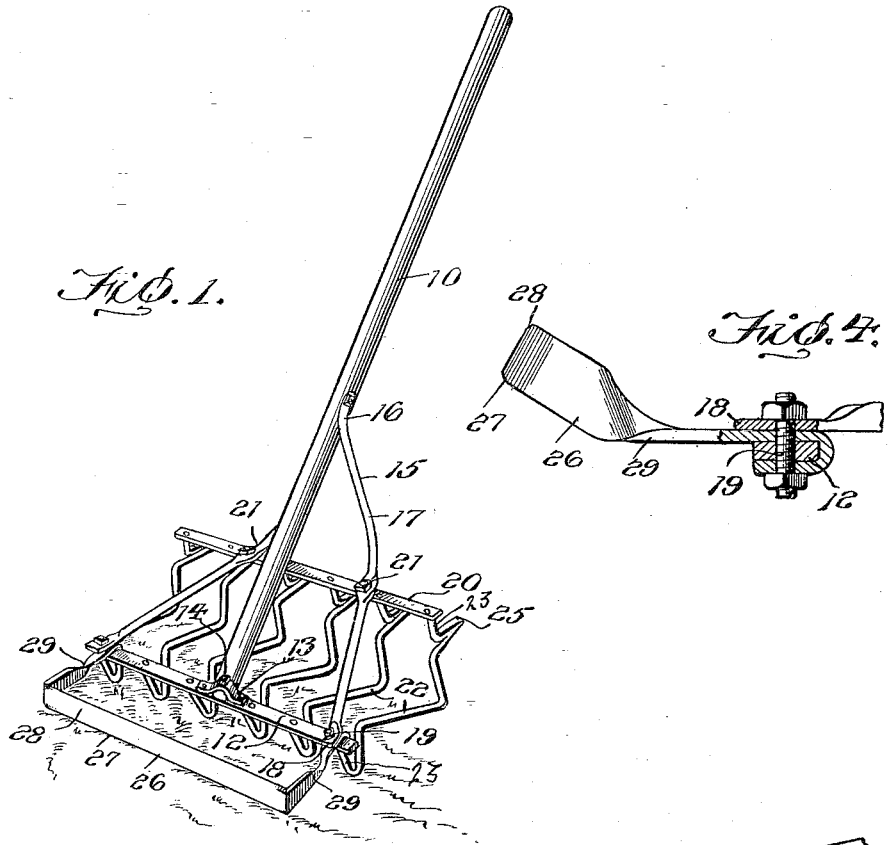
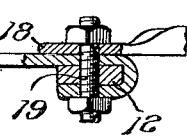
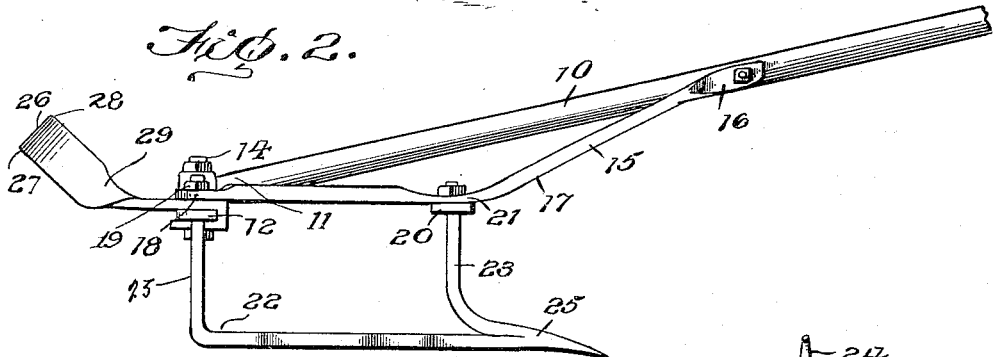
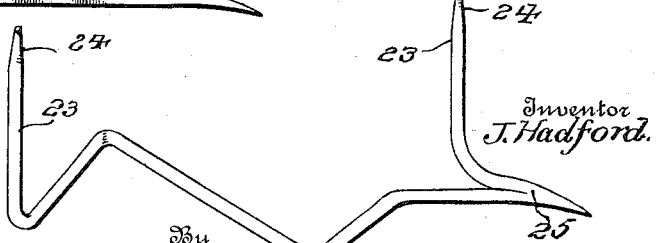

UNITED STATES PATENT OFFICE.

JOHN HADFORD, OF WAUKON, WASHINGTON.

AGRICULTURAL IMPLEMENT.

1,127,233.          Specification of Letters Patent.        Patented Feb. 2, 1915.

Application filed April 26, 1913. Serial No. 763,802.

*To all whom it may concern:*

Be it known that I, JOHN HADFORD, citizen of the United States, residing at Waukon, in the county of Lincoln and State of Washington, have invented certain new and useful Improvements in Agricultural Implements, of which the following is a specification.

This invention relates to an improvement in agricultural implements.

The primary object of the invention is to provide an implement for cultivating the ground which may be used as a soil pulverizer and as a weeder.

A further object of the invention is to provide a construction for pulverizing the soil which will act upon the soil in the same manner as a harrow, the members which constitute the pulverizer being so shaped that they will have a tendency to embed themselves in the soil as the implement is drawn across its surface.

Another object is to provide an implement which may be easily converted from a rake or cultivator to a weed cutter.

For a full understanding of the invention, reference is to be had to the following description and accompanying drawing, in which:—

Figure 1 is a perspective view; Fig. 2 is a side elevation; Fig. 3 is a perspective view of one of the scrapers; and Fig. 4 is a detail view showing the manner in which the cutter is supported on one of the pairs of scrapers.

Corresponding and like parts are referred to in the following description and indicated in all the views of the accompanying drawing by the same reference characters.

In the drawing, 10 designates a handle the terminal 11 of which is cut obliquely. A bar 12 is secured to the oblique face of the terminal of the handle by means of a yoke 13 which embraces the handle. A bolt 14 passes through the yoke, said bolt connecting the bar and handle, the terminals of the yoke being secured to the bar. A pair of braces 15 have their terminals 16 secured to the handle at a point remote from its terminal 11. These braces are bent downwardly as at 17, their terminals 18 being secured to the bar 12 by means of bolts 19. A bar 20 connects the braces 17, said bar 20 being disposed in parallel spaced relation with respect to the bar 12, the braces 15 being enlarged as at 21 to receive bolts which pass through the bar, the bolts supporting the bar on the braces. These bars support a plurality of scrapers 22 which consist of elongated bars bent into serpentine form and having their angles disposed in the same horizontal plane. The terminals of the bars are disposed at right angles to their body portions, producing arms 23 which are tapered as at 24, one of the arms 23 of each bar being received by the bar 12 which is provided with elongated openings through which the terminal projects. The other arm of each of the scraper bars is received by the bar 20, these terminals being swaged whereby the scraper bars are rigidly supported by the transverse bars 12 and 20.

At the junction of the serpentine body portions of the scrapers with the rear arms 23 are formed teeth 25 which are produced by bending the bar upon itself and flattening out the bent portions, thereby forming a sharpened and pointed cutting edge. These teeth 25 are curved downwardly whereby the scrapers will have a tendency to embed themselves in the ground as the implement is drawn across its surface.

From the foregoing it will be noted that as the scrapers are drawn across the ground, the teeth 25 will dig into the soil, turning it over, the serpentine body portions thoroughly pulverizing the soil as they pass through it, said body portions passing through the soil slightly below its surface. It will be seen that as the implement is drawn across the surface of the ground, with the handle in the position shown in Fig. 2, the scrapers will embed themselves into the soil without the operator exerting pressure on the handle, the natural inclination of the scrapers with respect to the weight of the entire structure being such as to project the teeth 25 into the ground. Thus it will be noted that the constant downward pressure necessary in the use of the usual rake or hoe need not be exerted with an implement of this character.

The weed cutting attachment consists of a knife 26 provided with cutting edges 27 and 28. The terminals of the knife 26 are bent at right angles, being twisted as at 29 and thereby disposing the end portions at right angles to the body portions. These end portions are bent to embrace the bar 12, the securing bolts 19 which fasten the braces 15 to the bar, passing through said end portions and clamping them to the bar.

It will be noted by this construction that when it is desired to use the implement as a weed cutter, its position with respect to the ground, as illustrated in Fig. 2, may be reversed, and the blade 26 used to sever the weeds. As the blade is formed with two cutting edges, the implement may be drawn back and forth, severing the weeds on both strokes.

The many advantages of an implement of this character will be clearly apparent, as it will be noted that the same will not only operate to effectually cultivate the ground, but that the arrangement is such as to produce a strong light-weight tool. While the scrapers are illustrated as having their body portions bent in serpentine form, they may be curved or of any other suitable configuration and they may also be of a cross sectional design other than that illustrated.

What I claim is:

1. An agricultural implement including a handle, spaced transverse bars carried thereby, and a plurality of scrapers having their terminals connected to the bars and having their body portions extending in a common plane at an angle to the handle, the scrapers being bent at the junction of their rear terminals and body portions to form points adapted to bite into the ground, when the implement is moved thereover.

2. An agricultural implement including a handle and a plurality of scrapers carried thereby, each of said scrapers being formed from a single rod or bar of metal bent to produce a body portion, terminal arms extending at approximate right angle thereto, and an integral tooth formed at the junction of one of the arms and the body member.

3. An agricultural implement including a handle, and a plurality of scrapers carried thereby, each of said scrapers including a body portion, terminal arms extending at an approximate right angle thereto, and a tooth member formed at the junction of the body member with one of the arms of each scraper, each of said tooth members being bent downwardly and having a sharpened terminal, whereby the scrapers will tend to dig into the ground when drawn thereover.

In testimony whereof I affix my signature in presence of two witnesses.

JOHN HADFORD. [L. S.]

Witnesses:
B. W. Hughes,
N. O. Kruhhoffer.

Copies of this patent may be obtained for five cents each, by addressing the "Commissioner of Patents, Washington, D. C."